United States Patent [19]

Gardner

[11] Patent Number: 4,901,306
[45] Date of Patent: Feb. 13, 1990

[54] WAVELENGTH-DIVISION MULTIPLEXED OPTICAL FIBER NETWORK

[75] Inventor: William B. Gardner, Duluth, Ga.

[73] Assignee: American Telephone and Telegraph Company, AT&T Bell Laboratories, Murray Hill, N.J.

[21] Appl. No.: 281,864

[22] Filed: Dec. 5, 1988

Related U.S. Application Data

[63] Continuation of Ser. No. 17,903, Feb. 24, 1987, abandoned.

[51] Int. Cl.$^4$ ............................................. H04B 9/00
[52] U.S. Cl. ......................................... 370/3; 455/612
[58] Field of Search ............... 455/600, 606, 607, 612, 455/617, 618, 619, 610, 609; 370/1, 3, 5

[56] References Cited

U.S. PATENT DOCUMENTS

| | | | |
|---|---|---|---|
| 3,986,020 | 10/1976 | Kogelnik | 370/1 |
| 4,182,935 | 1/1980 | Chown | 370/4 |
| 4,342,499 | 8/1982 | Hicks | 370/3 |
| 4,530,084 | 7/1985 | Strebel et al. | 455/607 |
| 4,592,043 | 5/1986 | Williams | 370/3 |
| 4,616,898 | 10/1986 | Hicks | 455/612 |
| 4,673,270 | 6/1987 | Gordon | 370/3 |
| 4,726,010 | 2/1988 | Ali | 370/3 |
| 4,742,576 | 5/1988 | McMahon | 370/3 |
| 4,778,238 | 10/1988 | Hicks | 370/3 |

FOREIGN PATENT DOCUMENTS

| | | | |
|---|---|---|---|
| 0164652 | 12/1985 | European Pat. Off. | 455/617 |
| 56-138346 | 10/1981 | Japan | 370/3 |
| 58-129849 | 8/1983 | Japan | 370/3 |
| WO86/04200 | 7/1986 | United Kingdom . | |

OTHER PUBLICATIONS

*IEEE Journal of Quantum Electronics*, vol. QE-21, No. 12, Dec. 1985, "Lightwave Primer" by P. S. Henry, pp. 1862-1879.

*Journal of Lightwave Technology*, vol. LT-1, No. 2, Jun. 1983, "Low-Loss Wavelength Division Multiplexing (WDM) Devices for Single-Mode Systems", by J. Lipson et al., pp. 387-390.

*Journal of the Optical Society of America*, vol. 65, No. 12, Dec. 1976, "Efficiency Limitations Imposed by Thermodynamics on Optical Coupling in Fiber-Optib Data Links", by D. H. McMahon, pp. 1479-1482.

*Electronics Letters*, vol. 22, No. 12, Jun. 5, 1986, "Demonstration of a Narrowband Bragg-Reflection Filter in a Single-Mode Fibre Directional Coupler" by M. S. Whalen et al., pp. 681-682.

*Proceedings of the SPIE*, vol. 568, San Diego, Aug. 19, 1985, "Applications of Coherent Optical Communication in the Network Environment", by H. Kobrinski, pp. 42-49.

*Proceedings International Communications Conference*, Toronto, Jun. 22-25, 1986, "A View of the Emerging Photonic Network", by C. A. Brackett, (5 pages).

*Telecommunication Journal*, vol. 52(7), (1985), "Wavelength Division Multiplexing Applied to Local and Trunk Optical Fibre Networks", by T. B. Meriem, pp. 408-413.

*Proceedings International Communications Conference*, Toronto, Jun. 22-25, 1986, "Application of Wavelength Division Multiplexing to Communication Network Architectures", by M. S. Goodman et al., pp. 931-933.

*Proceedings of the National Communications Forum*, vol. 39, 1985, pp. 353-356.

*Primary Examiner*—Robert L. Griffin
*Assistant Examiner*—L. Ven Beek
*Attorney, Agent, or Firm*—Eugen E. Pacher

[57] ABSTRACT

Disclosed is a dense channel packing wavelength division multiplexed optical fiber communication system that is parsimonious in its cable length requirements and that does not require the presence of widely tunable lasers at the remote terminals. The system comprises a central station and N remote stations (N frequently greater than about 50) connected to the central station by optical fiber means that comprise a "backbone" and 1 (1<l<N) fiber "laterals". Associated with each remote station $RS_i$ is a predetermined wavelength $\lambda_i$, typically in the spectral region 1.25-1.6 $\mu$m. The central station comprises means adapted for generating electromagnetic radiation of a multiplicity of distinct wavelengths including all $\lambda_i$. The radiation from the central station is coupled into the backbone fiber and transmitted to the laterals and the remote stations. Each remote station $RS_i$ comprises means for selecting the radiation of the associated wavelength $\lambda_i$ from radiation that comprises a multiplicity of wavelengths, and means for detecting the radiation of wavelength $\lambda_i$. Systems according to the invention can use coherent or direct detection, and advantageously are adapted for two-way signal traffic.

8 Claims, 3 Drawing Sheets

WAVELENGTH-DIVISION MULTIPLEXED OPTICAL FIBER NETWORK

This application is a continuation of application Ser. No. 017,903, filed Feb. 24, 1987, now abandoned.

FIELD OF THE INVENTION

This invention relates to optical fiber communication systems having at least one central station and a plurality of remote stations connected to the central station.

BACKGROUND OF THE INVENTION

Optical fiber has found widespread application as a long haul transmission medium for voice and data transmission. For instance, substantially all of the newly installed capacity in the long haul portion of the public switched telephone network in the U.S. is optical fiber-based.

Although optical fiber at present is not widely used in the feeder and distribution portion of multi-user networks, e.g., the telephone network, extension of the use of optical fiber into this portion of networks is desirable and is expected to occur within the near future, resulting ultimately in all-optical communication systems.

Since typically the equipment and labor costs for connecting a subscriber, or a group of subscribers, to a central office or other switching station is a major portion of the total cost of a communication system, the ability to provide such connection at relatively low cost is of utmost significance. It is generally true that a large portion (possibly as high as 70–80%) of the media costs (cables, connections, fanouts, enclosures, and pedestals) of a conventional lightguide distribution system is cable cost. Thus, there exists a strong incentive to reduce the amount of cable in a system.

Various architectures for lightguide distribution systems are known. See, for instance, H. Kobrinski, *Proceedings of the SPIE*, Vol. 568, pp. 42–49, San Diego, August 19, 1985, in which star and ring network configurations are discussed in the context of multiple-access and broadcasting optical fiber networks using dense wavelength division multiplexing (WDM).

Star-type networks are also disclosed in International patent application PCT/GB86/00018 (International Publication No. WO 86/04200). As will be readily appreciated, a star-configured network is generally not very economical with regard to the required length of transmission cable. On the other hand, ring networks may pose, inter alia, access and collision avoidance problems, and frequently do not match well the geometry of residential subscriber networks. Network architectures are also discussed, for instance, in C. A. Brackett, *Proceedings, International Communications Conference*, Toronto 1986, page 1730; and M. S. Goodman et al., ibid, page 931. Dense channel packing WDM distribution systems of the broadcasting type using coherent detection have been proposed. By a "dense channel packing" WDM system we mean herein a system having at least about 20, frequently more than 50, remote stations, with a typical spacing between wavelengths being 15 nm or less. Components potentially useful in such systems are discussed in T. B. Meriem, *Telecommunications Journal*, Vol. 52(7), page 408 (1985). Such systems generally require a widely (e.g., more than about 10 nm) tunable local oscillator at each remote station (subscriber). Such oscillators (lasers) are currently not commercially available and can be expected to be relatively costly once they do become available. Furthermore, the use of a widely tunable laser on the subscriber premises can be expected to pose control and stabilization problems.

Prior art dense packing WDM lightguide distribution system architectures thus typically would be relatively costly to implement, since they use relatively large amounts of optical fiber and/or require the use of widely tunable lasers on the customer premises.

Furthermore, WDM architectures which are satisfactory for a small number of wavelengths will frequently not be satisfactory for dense channel packing WDM (e.g., if the number of wavelengths N is greater than about 50). In any realistic system the multiplexing loss and the demultiplexing loss typically should not substantially exceed about 10 dB each. The use of some simple broadband couplers (e.g., balanced Y couplers) to accomplish the multiplexing and demultiplexing can severely limit the number of wavelengths, since each such coupler may introduce a 3 dB loss. See, D. H. McMahon, *Journal of the Optical Society of America*, Vol. 65(12), pp. 1479–1482 (1975), especially Example 3. On the other hand, narrow band couplers do not necessarily cause such large losses, and might conceivably have an average loss of only about 0.2 dB per coupler, due to unavoidable imperfections, finite passband width, and the like. A simple system that uses only narrow band couplers thus could perhaps accommodate up to about 50 different wavelengths.

In view of the potential importance of end-to-end optical communications, it would be highly desirable to have available a distribution system architecture that requires a relatively small quantity of optical fiber, that does not require the presence of widely tunable laser local oscillators at the remote stations, and that can accommodate a relatively large number of remote stations (subscribers). This application discloses such a system.

SUMMARY OF THE INVENTION

Disclosed is a dense channel packing wavelength division multiplexed optical fiber communication system (e.g., local area network or public switched network) comprising a multiplicity of remote stations (RS) connected to a central station (CS). The inventive system overcomes at least some of the above referred to shortcomings of prior art systems by requiring only a relatively small amount of optical fiber, by not requiring the presence of widely tunable lasers in the remote stations, and by being able to accommodate a relatively large number of remote stations. The inventive system thus offers the potential of high bandwidth (typically sufficient for at least one high resolution video channel), relatively low cost subscriber-to-subscriber optical communications. In preferred embodiments judicious combination of broadband and narrowband couplers makes it possible to accommodate a relatively large number of subscribers.

In particular, the inventive communication system comprises a multiplicity of remote stations $RS_i$ ($i=1, 2, \ldots N$), associated with each $RS_i$ is a predetermined wavelength $\lambda_i$ (all $\lambda_i$ are within a predetermined spectral region of width $\Delta\lambda$) and the central station comprises central station generating means adapted for generating electromagnetic radiation of wavelength $\lambda_1, \lambda_2, \ldots \lambda_N$. The term "central station" herein is intended to include not only central offices (i.e., local switching facilities) but also remote terminals at which the multiplicity of signals is multiplexed onto a high bandwidth fiber, herein referred to as the "backbone". In preferred embodiments the central station is a central office.

The remote stations are connected to the central station by first optical fiber transmission means that comprise a fiber "backbone" and l fiber "laterals" (1 < l < N), with the laterals being connected to the backbone, and substantially every remote station being connected to a lateral, such that radiation from the central station generating means is transmitted through backbone and laterals to the remote stations. Furthermore, each remote station $RS_i$ comprises detection means for detecting the electromagnetic radiation of wavelength $\lambda_i$ transmitted from the central station through the first optical fiber transmission means, and further comprises wavelength selective means adapted for selecting the radiation of wavelength $\lambda_i$ from radiation comprising a multiplicity of wavelengths, such that substantially only the radiation of wavelength $\lambda_i$ is detected by the detection means of a given remote station $RS_i$.

The use of a single fiber to carry the traffic for a multiplicity of remote stations $RS_i$ between the CS and a point close to the remote stations results in substantial fiber (and cable) savings, e.g., a length reduction by approximately two orders of magnitude, when compared to a simple star architecture. By associating a predetermined wavelength $\lambda_i$ with each $RS_i$ the need for widely tunable lasers at the RS is eliminated.

In one exemplary embodiment of the invention, the detection means are coherent detections means, and the preferred wavelength selective means comprise a relatively narrow band coupler having a bandwidth that is substantially less than $\Delta\lambda$, exemplarily about 15 nm.

In another exemplary embodiment the detection means are direct detection means, and the first optical fiber transmission means comprise wavelength selective coupling means (e.g., a Fabry-Perot etalon) for selectively coupling radiation from the backbone into the lateral, and the wavelength selective means comprise a narrow band coupler having a bandwidth that is substantially less than $\Delta\lambda$.

DETAILED DESCRIPTION OF SOME PREFERRED EMBODIMENTS

Figure 1:
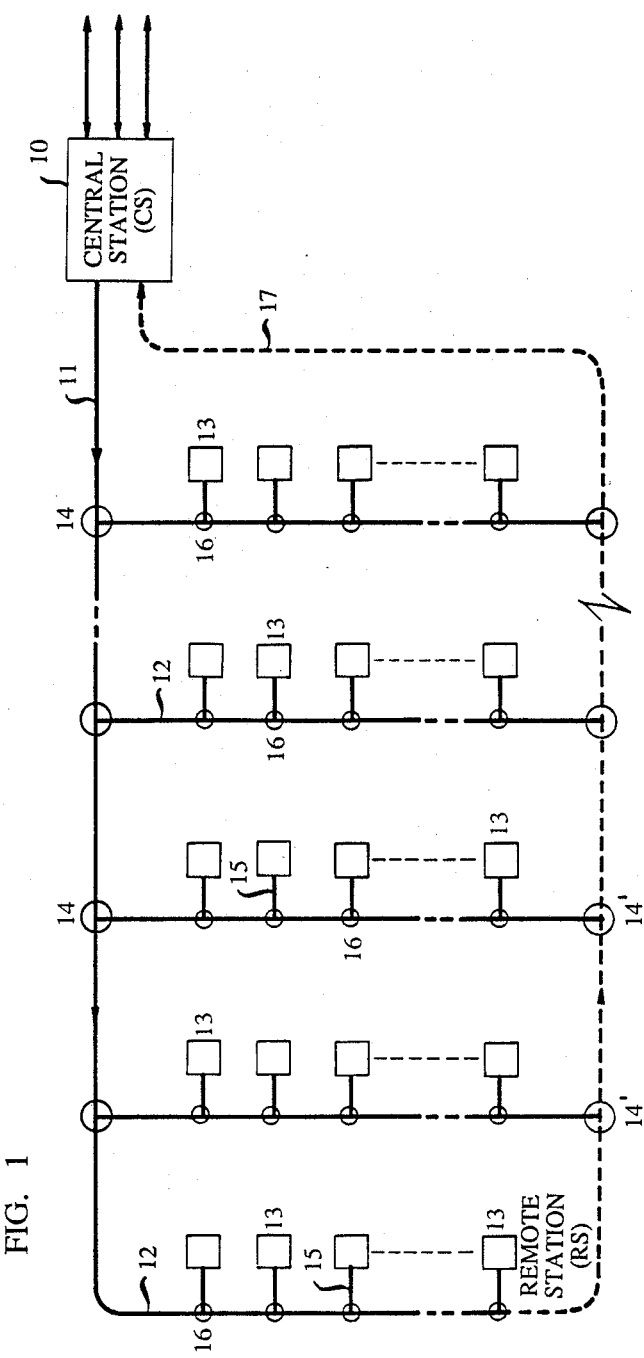
FIGS. 1 and 2 schematically depict exemplary communication systems according to the inention.

FIG. 1 schematically depicts an exemplary communicaion system according to the invention, wherein central station 10 is connected by means of backbone fiber 11 (typically a cabled single mode optical fiber) to a cluster of remote stations 13, exemplarily subscriber stations in a housing development, city neighborhood, or the like. The CS 10 typically is connected to one or more other central stations, not shown.

The backbone typically is substantially longer than any of the lateral fibers 12, which are connected to the backbone by known coupling means 14 that are typically contained in a protective housing, conventionally referred to as a closure. For instance, in the U.S. a typical backbone length (CS to closures) is about 6.0 km, and a typical lateral length is about 0.5 km. A given RS typically is joined to a lateral by means of a (typically short) fiber 15, conventionally referred to as a drop, connected to the lateral by known coupling means 16 that are typically contained in a protective housing, conventionally referred to as a pedestal.

Generally two-way communication will be desired, and systems according to the invention can accommodate, in addition to outbound (CS to RS) also inbound (RS to CS) signal transmission. This is advantageously accomplished by, inter alia, use of 2-fiber drops (not shown), and provision of a backbone fiber 17 connected to the laterals by coupling means 14', as shown in FIG. 1. Other techniques for obtaining a two-way communication capability are known (e.g., using a single backbone for both inbound and outbound signals), but are at present not considered to be preferred.

Although the RS typically are connected to the CS via drops, laterals, and a backbone, an inventive communication system may in some cases also comprise a relatively small number of RS that are connected to the CS via drops and backbone, or even via backbone only, as will be appreciated by those skilled in the art. Furthermore, more than one RS can be connected to a given lateral by a single drop, or be connected to the lateral at a single pedestal. Similarly, more than one lateral can be connected to the backbone at a single enclosure. Furthermore, it is possible that a given wavelength $\lambda_i$ be associated with more than one remote station, and/or that one or more remote stations each may cosist of a multiplicity of subscribers. In the latter case time division multiplexing (or any other appropriate scheme) may, if desired, be employed to provide each subscriber with private communication means. All such obvious modifications of the basic inventive architecture are contemplated. However, in order to simplify the exposition, from hereon the discussion will be in terms of the exemplary simple matrix-like architecture of FIGS. 1 and 2, in which it is assumed that a one-to-one relationship exists between $RS_i$ and $\lambda_i$.

Associated with each connection point (e.g., 14 and/or 16 of FIG. 1) is a certain amount of signal loss, and it is generally advantageous to arrange the system layout such that this signal loss is minimized. For a system of N remote stations $RS_i$ (i=1, 2, ... N), and l laterals (1 < l < N), with d drops per lateral, it can easily be shown that the signal loss associated with connection points is minimal if $d = l = N^{\frac{1}{2}}$. Thus, a distribution system according to the invention is advantageously laid out substantially as a square "matrix", with l laterals (columns) and, ideally d=l drops per lateral (rows).

We envisage that communication systems according to the invention typically will have a substantial number of RS, frequently N > 50. All the wavelengths $\lambda_i$ associated with the N remote stations $RS_i$ are typically in the approximate range 1.25–1.6 µm, provided the optical fibers are silica-based optical fibers of the type that is currently generally used. Although presently not preferred, an inventive communication system could also be operated in a different spectral region, e.g., in a range that includes 0.8 µm.

Figure 2:
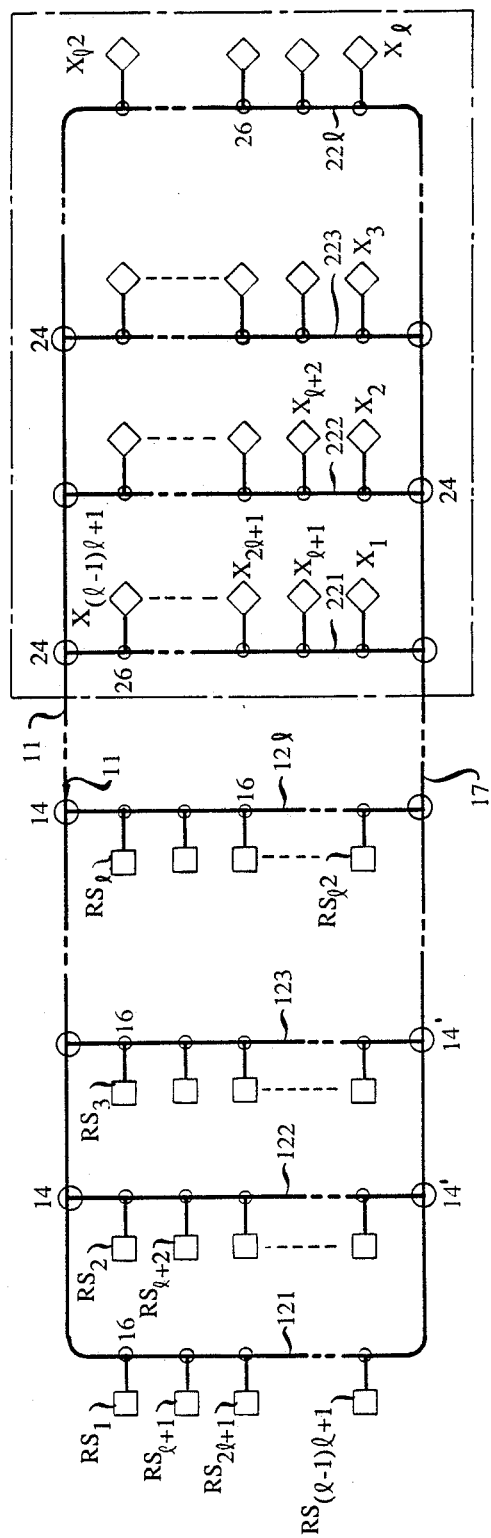

FIG. 2 schematically depicts an exemplary distribution system according to the invention, the system having $N = l^2$ remote stations, l laterals 121, 122, ..., 12l, with l remote stations served by each lateral. It will of course be appreciated that such regularity is not a requirement of the invention. FIG. 2 also shows central station 10 with associated transmitters/receivers $X_1$, $X_2$, ... $X_{l^2}$. As shown, each $RS_i$ has an associated $X_i$. However, this is not necessarily so. For instance, if the transmitter lasers are widely tunable and, depending, inter alia, on traffic load, a given transmitter/receiver may serve two or more RS, or no predetermined assignment of transmitter/receiver to RS may be made. Connections to other central stations are typically present but are not shown.

In one embodiment the communication system of FIG. 2 comprises coherent detection. For background on coherent systems see, for instance, P. S. Henry, *IEEE Journal of Quantum Electronics*, Vol. QE-21(12), page 1862, and *Proceedings of the National Communications Forum*, Chicago, 1982, page 353.

In a coherent distribution system according to the invention, couplers 14 typically are wideband couplers (i.e., their properties are substantially independent of wavelength over the relevant range of wavelengths) that divert a predetermined fraction of the radiation power into the lateral. Although the diverted fraction can be the same at all couplers, it is preferable to select the couplers such that each lateral receives approximately the same radiation power. For instance, selecting the couplers 14 such that the coupling ratios into laterals 122, 123, ... 12l are 1:1, 2:1, ... (l−1):1, respectively, results in substantially equal power in each of the laterals. Broadband couplers that can perform this function are well known. For instance, a broadband coupler whose splitting ratio is adjustable is commercially available from Fibernetics of Belmont, CA.

In a coherent distribution system as shown in FIG. 2 the wavelengths $\lambda_i$ are chosen such that no two wavelengths differ by less than some amount $\delta\lambda$, which can in principle be even less than 0.01 nm. However, in practice $\delta\lambda$ will frequently be substantially larger, e.g., of the order of 1 nm. For instance, in an exemplary distribution system serving 144 remote stations, the wavelengths can be chosen such that the wavelengths in a given "row" (of the matrix formed by the RS, as depicted in FIG. 2) are 1 nm apart, and in a given "column" are 15 nm apart, extending from about 1430 nm to about 1606 nm ($\Delta\lambda = 176$ nm).

In a preferred embodiment of the inventive coherent distribution system, couplers 16 advantageously are wavelength selective couplers having a bandwidth substantially less than $\Delta\lambda$, exemplarily about 15 nm. The narrow band couplers are chosen such that $\lambda_i$ is located approximately centrally within the passband of the coupler associated with any given $RS_i$. Couplers that meet the requirements are known, e.g., dielectric interference filters and gratings. See, for instance, J. Lipson et al, *Journal of Lightwave Technology*, LT-1, page 387 (1983).

In the coherent distribution system according to the invention, each $RS_i$ comprises a local oscillator (laser) that emits radiation nominally of wavelength $\lambda_i$, to be "mixed" with the radiation that is coupled into $RS_i$ from the lateral by means of connector 16 in a known manner. As will be appreciated by those skilled in the art, although both the wavelength from the CS and the local oscillator wavelength are nominally $\lambda_i$, there is actually a small difference between the two (corresponding typically to a frequency difference on the order of a GHz or so). The difference typically is predetermined, such that a pre-set electronic filter can be used in the coherent detection. It thus may be advantageous to provide a local oscillator that is tunable, but tunability over only a narrow range of wavelengths (typically < 1 nm) is required. A coherent detection system may also require polarization drift compensation means at each RS.

As will be appreciated by those skilled in the art, an inventive coheret distrybution system with a sufficiently generous loss budget could, in princaple, use wideband couplers instead of the currently preferred narrow band couplers to connect some or all RS to the laterals, s)nce the coherent detec4ion process itself provides wavelength selectivity.

In another embodiment, the distribution system of FIG. 2 uses direct (non-coherent) detection Of the signal radiation $\lambda_i$ at any $RS_i$. In a preferred embodiment of the inventive direct detection distribution system, couplers 14 are Fabry-Perot etalons (see, for instance, T. B. Meriem, op. cit.) or Bragg reflection fiber directional couplers (see, for instance, M. S. Whalen et al., *Electronics Letters*, Vol. 22, pp. 681–682, (1986)) and couplers 16 are narrow band couplers (see, for instance, J. Lipson et al., op. cit.). In this way it can be assured that essentially only radiation of wavelength $\lambda_i$ reaches the detector of $RS_i$, and that the losses in the system are kept relatively low.

Figure 3:
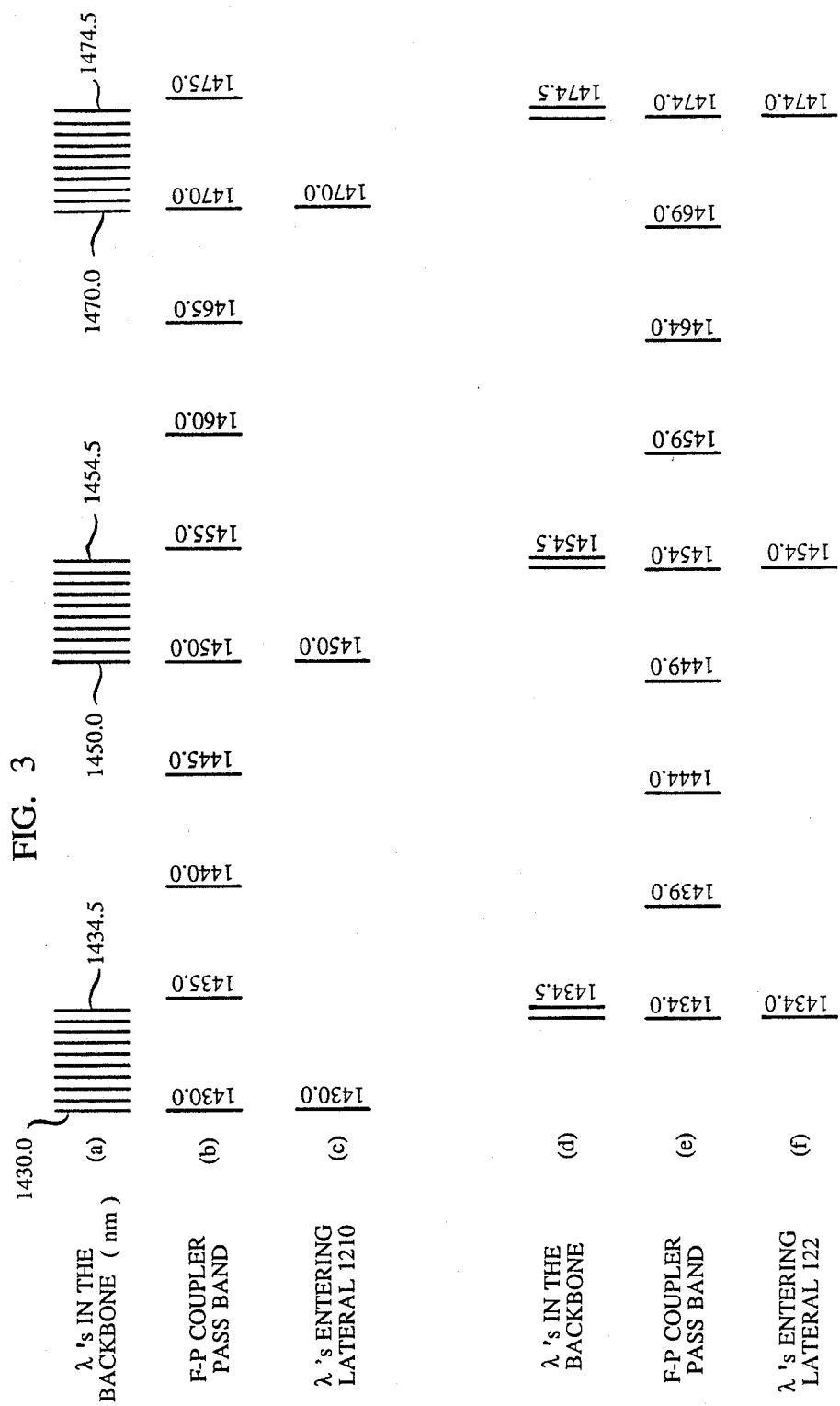
FIG. 3 shows the wavelengths of s)gnals at various points in an exemplary direct detection communicapion system according t the ivention, as well as the pass band wavelengths of two Fabry-Perot etalons in the c/-munication system.

FIG. 3 illustrates an exemplary wavelength assignment and filtering scheme for a direct detection communication system as depicted in FIG. 2, having 10 laterals of 10 RS each. The wavelengths $\lambda_i$ are arranged in 10 groups of 10, as indicated in line (a) of FIG. 3. Each Fabry-Perot (F-P) etalon is designed to pick out one wavelength from each group of wavelengths, to couple these 10 wavelengths into the lateral associated with the etalon, and to pass all other wavelengths with minimal attenuation. This is illustrated in lines (b) and (c) of FIG. 3 with respect to the F-P coupler associated with the first lateral (which is 1210 in FIG. 2, since l is assumed to be 10) and in lines (d), (e) and (f), FIG. 3 with regard to the F-P coupler associated with lateral 122 of FIG. 2. In the exemplary scheme, the wavelengths propagating in any given lateral are spaced 20 nm apart, and thus can be easily separated by known means.

Preferred embodiments of the invention allow for inbound as well as outbound communication. In such embodiments the RS comprise radiation generating means (typically a laser), and the CS comprises radiation detection means.

In particular, a given $RS_i$ comprises radiation generating means adapted for emitting radiation nominally of wavelength $\lambda_i$. As will be appreciated by those skilled in the art, it will frequently be advantageous if the radiation received by a given $RS_i$ is not of exactly the same wavelength as the radiation transmitted by the $RS_i$, but differs by a small amount (e.g., corresponding to about 10 GHz in a coherent detection system) in order to avoid interference between outbound and inbound signals.

In a two-way communication system according to the invention the CS detection means can comprise coherent or direct detection means, and can be arranged in any appropriate manner. For instance, CS detection means can be associated with RS generation means, on a one-to-one basis, as shown schematically in FIG. 2. In preferred embodiments the same detection type (coherent or direct) is used both in the RS and CS, but combinations of coherent and direct detection are also envisaged. In general, the CS in a two-way communication system according to the invention comprises D detectors ($1 \leq D \leq N$) connected to the inbound fiber transmission means by means that comprise wavelength selective couplers which insure that any given CS detector receives, at any given time, substantially only radiation from at most one RS.

What is claimed is:

1. An optical communication system for transmitting information signals between a central station and a multiplicity of subscriber stations $RS_i$ ($i=1, 2, \ldots N$) connected to the central station by first optical fiber transmission means; characterized in that
   (a) associated with any given subscriber station $RS_j$ is at least one distinct predetermined wavelength $\lambda_j$, with all the predetermined wavelengths being within a spectral region $\Delta\lambda$;
   (b) the central station comprises central station generating means adapted for generating electromagnetic radiation of a multiplicity of distinct wavelengths including the predetermined wavelengths within $\Delta\lambda$;
   (c) the first optical fiber transmission means comprise
      (i) a "backbone" fiber connected to the central station such that radiation comprising the predetermined wavelengths within $\Delta\lambda$ can be coupled into the backbone;
      (ii) l fiber "laterals" ($1<l<N$), each given lateral connected to the backbone by means that comprise means for coupling radiation power from the backbone into the lateral such that radiation of a multiplicity of wavelengths within $\Delta\lambda$ can be coupled into the given lateral from the backbone; and
      (iii) means for connecting a multiplicity of subscriber stations to a given lateral, the means comprising a multiplicity of fiber "drops" and wavelength selective first coupling means for coupling a given drop to the lateral; and
   (d) the given subscriber station $RS_j$ comprises radiation detection means, the wavelength selective first coupling means are selected such that only an information signal associated with the wavelength $\lambda_j$ can be received by the subscriber station $RS_j$; wherein
   (e) at least one given subscriber station $RS_j$ comprises subscriber station generating means adapted for generating electromagnetic radiation of substantially the wavelength $\lambda_j$ associated with $RS_j$, and wherein the communications system further comprises second optical fiber transmission means, connected to the subscriber station generating means, and central station radiation detection means that are connected to the second optical fiber transmission means, such that the radiation substantially of wavelength $\lambda_j$ can be transmitted from $RS_j$ to, and be detected by, the central station detection means, with the central station radiation detection means comprising D central station radiation detectors ($1 \leq D < N$) connected to the second optical fiber transmission means by means that comprise wavelength selective couplers adapted for insuring that any given central station radiation detector receives, at any given time, substantially only radiation from at most one of the subscriber stations.

2. The communications system of claim 1, wherein the radiation detection means comprise coherent detection means, and the wavelength selective first coupling means comprise a narrow band coupler having a bandwidth that is substantially less than $\Delta\lambda$.

3. The communications system of claim 2, wherein the means for coupling radiation power from the backbone fiber into the laterals are selected such that substantially equal radiation power is coupled into each respective lateral.

4. The communications system of claim 1, wherein the first optical fiber transmission means comprise wavelength selective second coupling means for coupling radiation from the backbone into the laterals, and wherein the wavelength selective first coupling means comprise a narrow band coupler having a bandwidth that is substantially less than $\Delta\lambda$.

5. The communications system of claim 4, wherein the wavelength selective second coupling means comprise at least one Fabry-Perot etalon or at least one Bragg reflection fiber directional coupler.

6. The communications system of claim 1, wherein the number N of subscriber stations is greater than about 50, and wherein $\Delta\lambda$ lies within a spectral region that extends from about 1.25 $\mu$m to about 1.6 $\mu$m.

7. The communications system of claim 1, wherein the length of the backbone is substantially greater than that of any lateral.

8. The communications system of claim 1, wherein the given subscriber station $RS_j$ further comprises wavelength selective means.

* * * * *